March 22, 1938.  J. KOSMAN ET AL  2,111,894
BREAD LOAF FORMING MACHINE
Filed Sept. 12, 1934   6 Sheets-Sheet 1
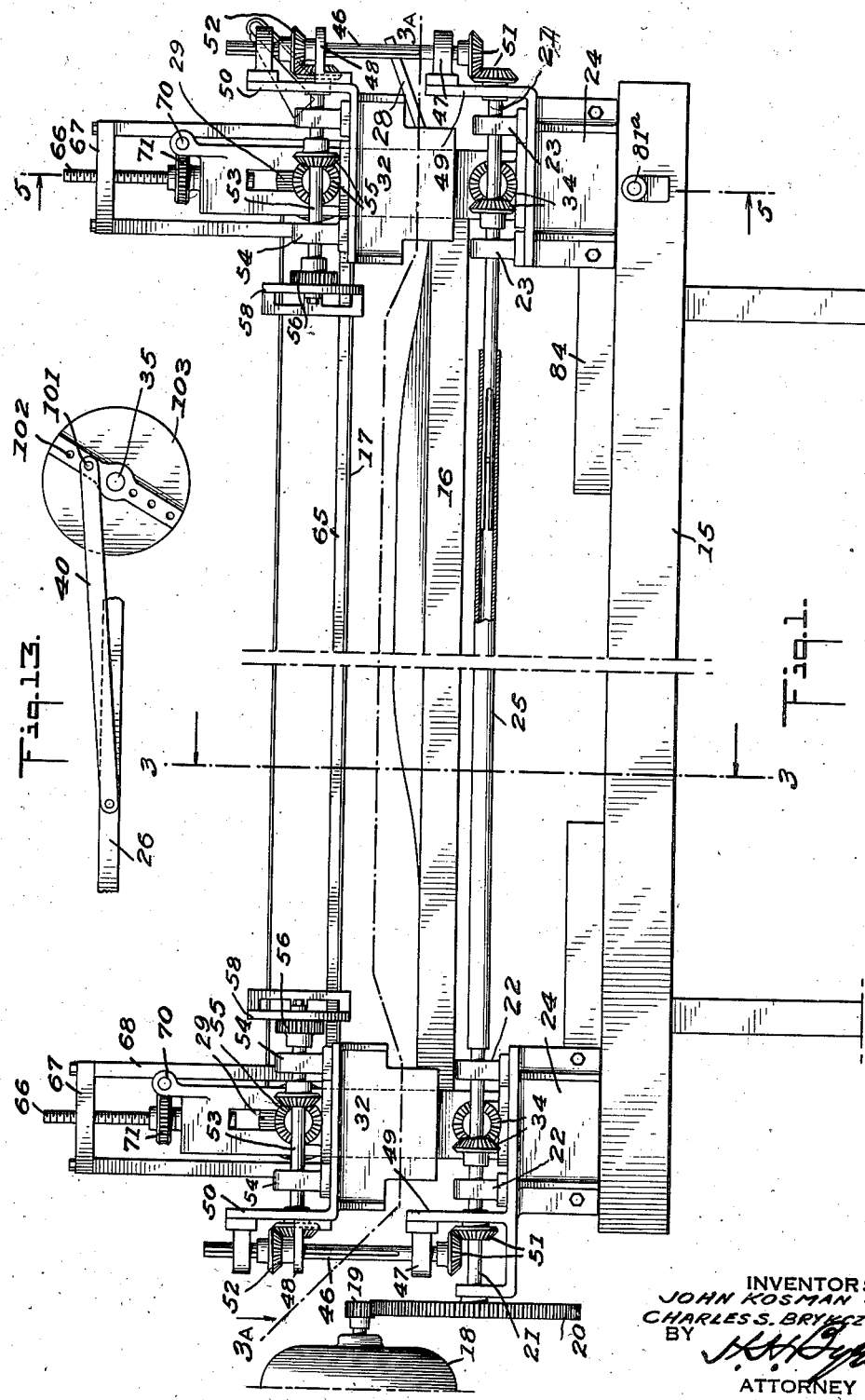
INVENTORS
JOHN KOSMAN AND
CHARLES S. BRYLCZYNSKI
BY
ATTORNEY

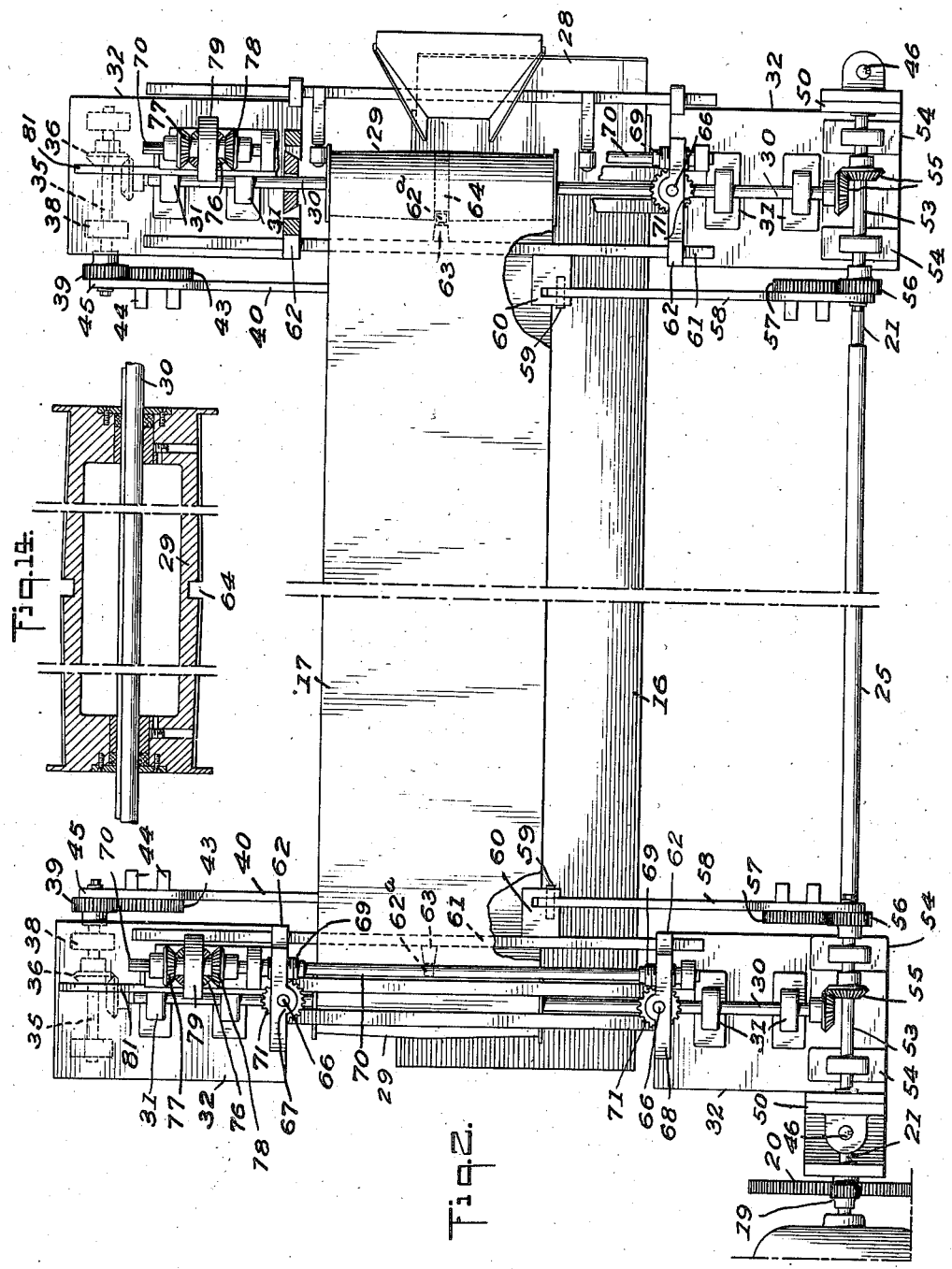

March 22, 1938.　　J. KOSMAN ET AL　　2,111,894
BREAD LOAF FORMING MACHINE
Filed Sept. 12, 1934　　6 Sheets-Sheet 3
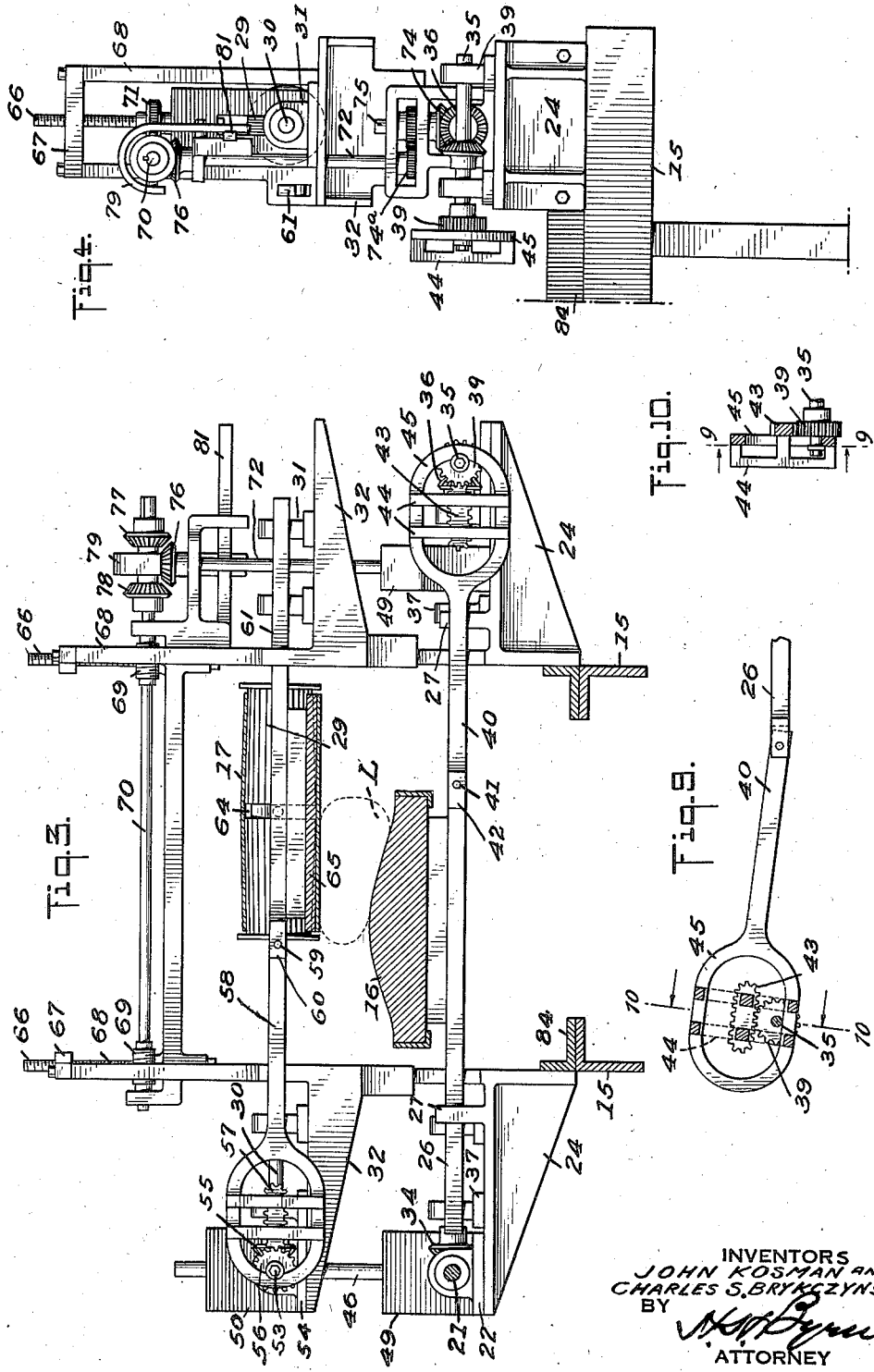
INVENTORS
JOHN KOSMAN AND
CHARLES S. BRYKCZYNSKI
BY
ATTORNEY

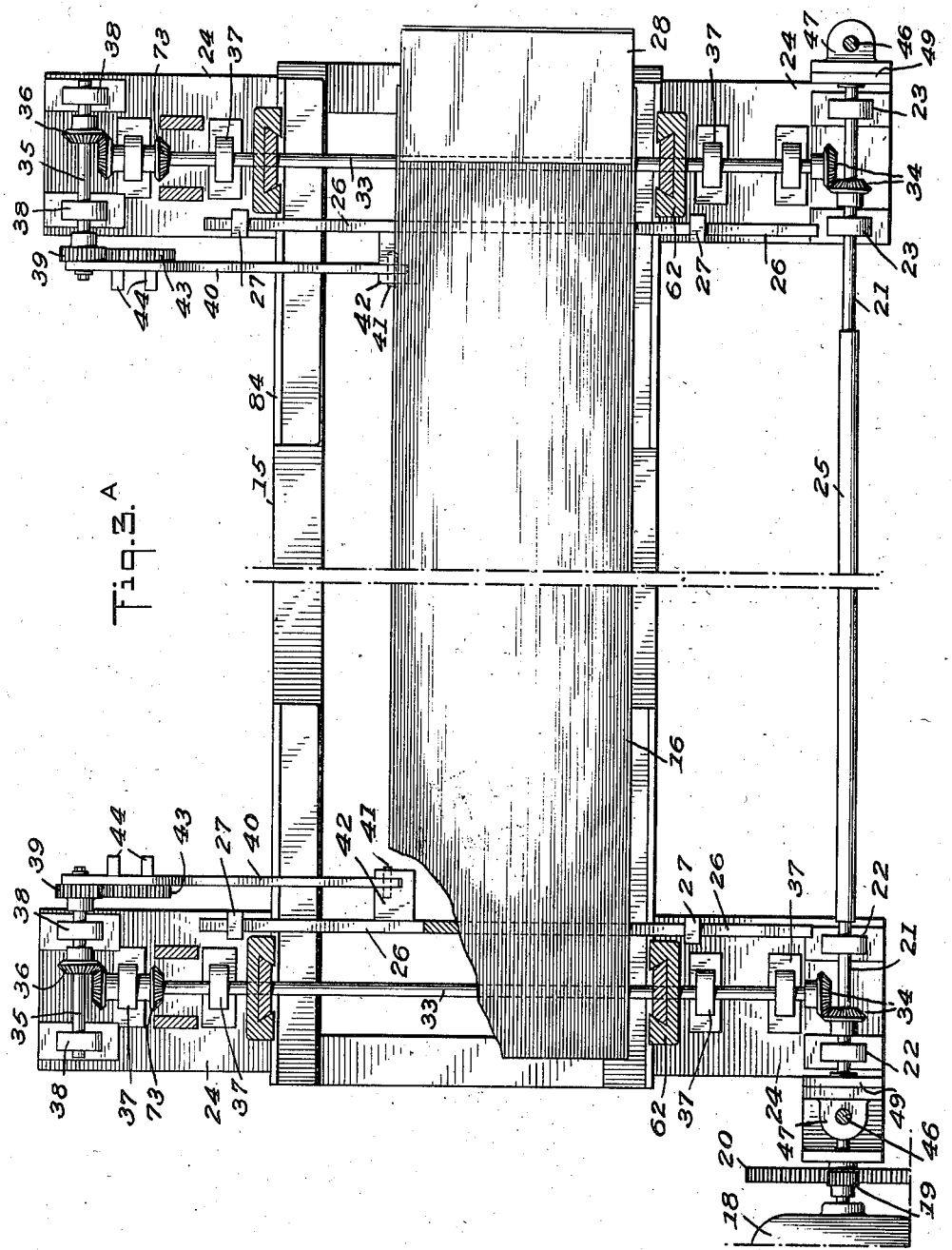

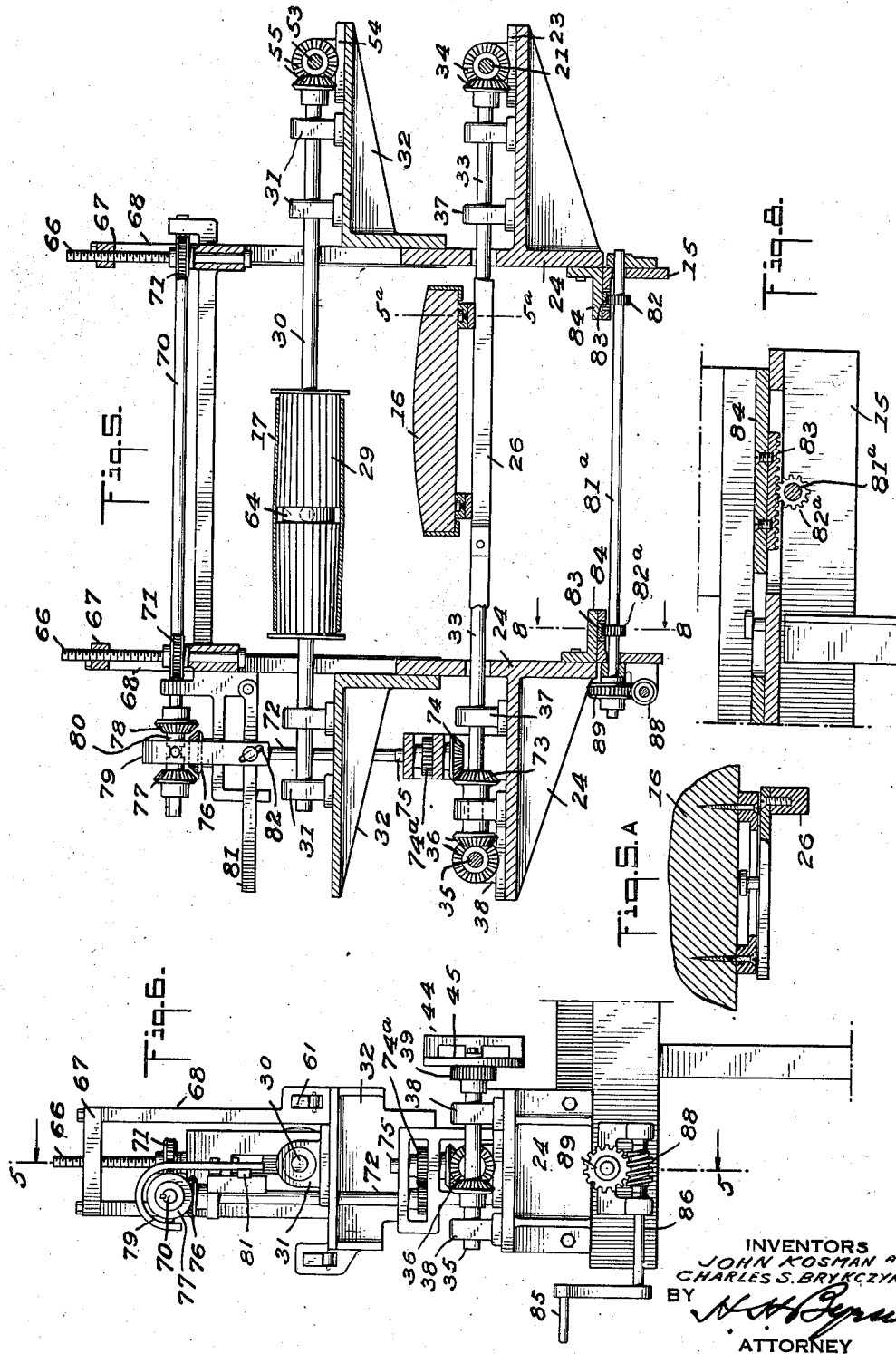

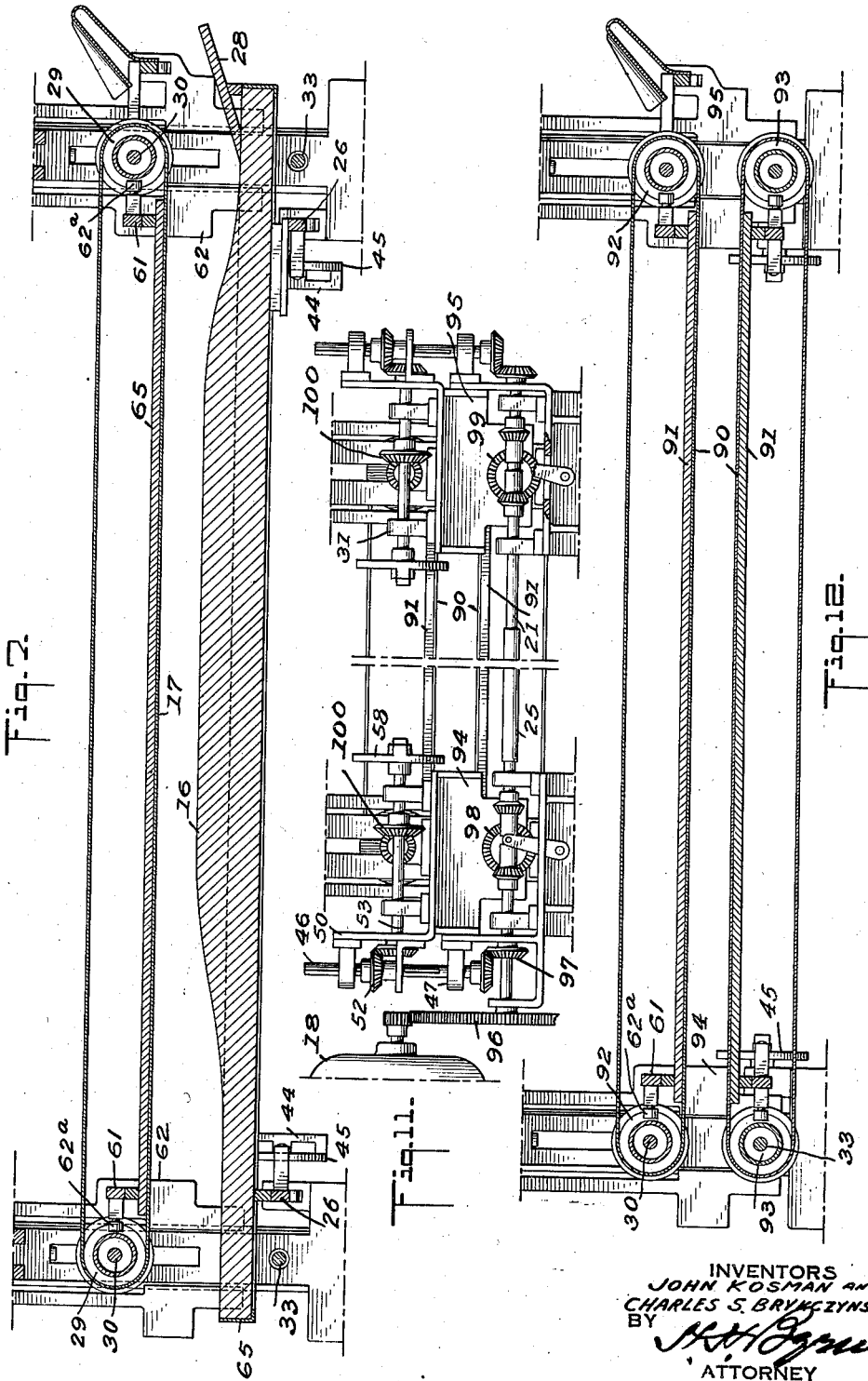
March 22, 1938.  J. KOSMAN ET AL  2,111,894
BREAD LOAF FORMING MACHINE
Filed Sept. 12, 1934   6 Sheets-Sheet 6
INVENTORS
JOHN KOSMAN AND
CHARLES S. BRYKCZYNSKI
BY
ATTORNEY Patented Mar. 22, 1938

2,111,894

UNITED STATES PATENT OFFICE 2,111,894

BREAD LOAF FORMING MACHINE

John Kosman and Charles S. Brykczynski, New York, N. Y., assignors to Geo. F. Stuhmer & Company, Brooklyn, N. Y., a corporation of New York Application September 12, 1934, Serial No. 743,755

12 Claims. (Cl. 107—9)

The present invention relates to bakery equipment or bread making machinery and consists in the combinations and arrangements of elements hereinafter described and particularly set forth in the accompanying claims.

The purpose of the invention is to provide a bread making apparatus wherein pieces of dough from a dough dividing machine may be subjected to the requisite kneading or working while being conveyed or transferred to the baking oven, thereby avoiding the necessity for employing the usual dough rounder or dough moulding equipment with the consequent saving of expense for such machinery and the cost incident to the upkeep or maintenance thereof, and in which the resultant product is in all respects up to the standard required before delivery to the oven.

A further purpose of the invention is to provide a bread working or kneading machine and a conveyer apparatus in one unitary and single mechanism wherein both the dough working and conveying functions are carried on simultaneously and in one continuous and unbroken operation without handling of the material, and in which the loaves or pieces of dough are worked upon with just that degree or extent required for proper baking.

The invention is characterized essentially in that it embodies a novel design of dough working surface or table and a co-operable endless belt, said table having limited lateral-wise movement, and the belt having both a lateral-wise movement and simultaneously lengthwise travel, such movements of the table and belt being opposite in time. Means are provided for regulating with accuracy the dough working space between the table and belt, in accordance with the character of material in hand and the product to be baked.

The invention is shown by way of illustration in the accompanying drawings, wherein:

Figure 1 is a side elevational view of the machine.

Figure 2 is a top plan view thereof.

Figure 3, a transverse sectional view taken on the line 3—3 of Figure 1.

Figure 3a, a horizontal sectional view taken on the line 3ª—3ª of Figure 1.

Figure 4, a side elevation of Figure 3.

Figure 5, a transverse section taken on the line 5—5 of Figure 1 and 5—5 of Figure 6.

Figure 5a, a detail sectional view taken on the line 5ª—5ª of Figure 5.

Figure 6 is a side elevation of Figure 5.

Figure 7, a longitudinal sectional view of the loaf working or kneading table and its co-operable belt.

Figure 8, a detail sectional view along the line 8—8 of Figure 5.

Figure 9, a detail view on the line 9—9 of Figure 10, showing the construction of reciprocating device employed for the kneading table and its co-operable belt.

Figure 10, a section along the line 10—10 of Figure 9.

Figure 11, a side elevation, showing a modified construction.

Figure 12, a longitudinal section of the modified form.

Figure 13, a detail view of another type of reciprocating device that may be used in lieu of the construction shown in Figures 9 and 10; and Figure 14, a longitudinal section of the belt pulley employed.

Referring to the construction in further detail and wherein like reference characters designate corresponding parts in the different figures shown, the apparatus consists of a suitable supporting structure with a base portion 15 on which is mounted, at either end, an upright frame having journalled therein suitable transmission gearing for imparting the necessary movements of operation to the dough working and loaf conveyer elements comprising essentially a kneading table 16 and a co-operable belt 17 located immediately over and in appreciably cross relation to said table. An electric motor 18 or other suitable source of power operates said table 16 and belt 17 through pinions 19—20 geared to a transmission shaft 21 journalled in bearings 22 and 23 on brackets 24 projecting laterally from the supporting structure 15, as clearly shown in Figures 1, 3a and 5. The transmission shaft 21 is provided with a splined sleeve section 25 to provide for lengthwise adjustment of the dough working elements.

The loaf working or dough kneading table 16 is mounted to have lateral-wise movement by a pair of crossbars 26 that have sliding engagement with the apertured studs or blocks 27 on the brackets 24, as shown clearly in Figure 3a; and in like manner the endless belt 17 is mounted to have lateral-wise movement in co-operative relation with the table, and simultaneously therewith said belt travels lengthwise to carry the worked dough from the forwarding or receiving hopper 28 adjacent a dough divider to the discharge end of the machine from whence said shaped loaves are ready for delivery to the baking oven. Said dough working and forwarding belt 17 is co-extensive with the table 16 and is mounted to travel on fluted or corrugated rollers 29 (Figures 1, 2, 3 and 5) splined on shafts 30 that are journalled in bearings 31 on the bracket arms 32.

The lateral-wise movement of the table 16 is imparted by two countershafts 33 through bevel gears 34, and countershafts 35 by bevel gears 36 (Figure 3a), and said shafts 33 and 35 have suitable journal bearings 37 and 38 in brackets 24 on the frame. The pinions 39 on countershafts 35 transmit motion directly to two pitmans 40 having pivotal connections 41 with the blocks 42 on the table supporting crossbars 26, and elliptical gears 43 on the pitmans meshing with pinions 39 effect the rectilinear or lateral-wise motion to the table 16. Crosspieces 44 on yokes 45 hold the elliptical toothed racks 43 in mesh witht pinions 39 as shown (Figure 3 and 3a). It will, therefore, be seen that with this arrangement the dough working table 16 will have imparted thereto a lateral-wise movement within one and the same plane, and in co-operation with the belt 17 gives the necessary working or kneading to the pieces or loaves of dough while the same are being transferred for delivery to the oven.

The gearing transmission for the belt rotating devices consists of two upright shafts 46 (Figures 1, 2 and 4) in journal bearings 47 and 48 on arms 49 and 50 of the fixed and movable brackets 24 and 32, respectively. Said shafts 46 have bevel gear drives 51 from main shaft 21, and in turn drive the bevel gears 52 of countershafts 53 journalled in blocks 54 on the brackets 32. Similar bevel gearing 55 connects each of said shafts 53 with each of the shafts 30 on which are splined and rotatably mounted the belt supporting and driving pulleys 29, and during rotation of the two belt carrying pulleys 29, or when the belt is traveling lengthwise, said pulleys have imparted thereto a simultaneous crosswise movement identical with that of the co-operating table 16, but in opposite timed relation thereto. That is to say, both the table and belt move sidewise simultaneously, but in opposite directions. Such lateral-wise movement is imparted to the belt pulleys through a mechanism in all essentials the same as that described above for imparting lateral-wise movement to the table. Thus each of the countershafts 53 (Figures 2 and 3) has a pinion 56 gearing with rack 57 carried by a pitman 58 that pivotally connects at 59 with block 60 of crossbar 61 which reciprocates in bearings 62 on the frame 32 as shown. Each of said bars 61 carries a roller 62a on a stud 63 that engages within an annular groove or channel-way 64 formed in each of the pulleys (Figure 2), and it will, therefore, be seen that as the pulleys 29 are rotated they are shifted from side to side on their shafts in just the same manner as the table 16.

The dough working and forwarding belt 17 is provided with an abutting or resistant element comprising a board or other rigid surface 65 (Figures 1, 3 and 7) which is co-extensive therewith and lies in immediate contact with the lower run or active length of said belt and thereby the requisite pressure is exerted on the loaf of dough L, as indicated in Figure 3. And, to the end that said pressure may be regulated or set according to the work in hand, the belt 17, together with the abutting element 65, is adapted to have vertical adjustment.

The belt adjusting means consists of four screw-threaded shafts 66 (Figures 1, 3 and 5) located substantially at the four corners of the machine and having screw engagement at 67 with the frame uprights 68 whereby to raise and lower said frames when rotation is imparted to said shafts 66 through the screw gears 69, on transverse shaft 70, meshing with worm gears 71 on shafts 66. Motion is imparted to said shafts 70 by two vertical shafts 72 driven from main shaft 21 by the gears 73 and 74, and pinions 74a on countershafts 75 (Figures 5 and 6). The bevel gears 76 of shafts 72 have selective engagement with opposed bevel gears 77 or 78 on shafts 70 accordingly as the belt 17 is to be raised or lowered. The gear shifting device at each end of the machine comprises a yoke 79 engaging the sleeve 80 connecting the gears 77 and 78, and a hand lever 81 having slotted engagement 82 with said yoke as shown. It will be understood, of course, that the belt adjusting device just described, and which is located at the receiving end of the machine, is in all respects the same as that at the discharge end of the machine, and the elements thereof are numbered correspondingly herein.

The means for adjusting the belt in its lengthwise direction consists of a horizontal shaft 81a journalled in the supporting structure 15 (Figures 5 and 6) and having pinions 82a engaging rack sections 83 secured to the angular or ledge portions 84 of the frame 24. Said racks and pinions 82a and 81a are adapted to shift said frame portions 84 when the shaft 81a is rotated by the crank arm 85 of shaft 86 having screw gear 88 meshing with worm gear 89 on shaft 81a as shown. It will, therefore, be seen that, through the instrumentality of the hand operated crank 85, the entire belt and kneading table apparatus at the delivery end of the machine may be adjusted or regulated at will, and in similar manner either or both end structures for the belt apparatus may be raised or lowered with infinite precision and that any adjustment thereof will be effectively maintained.

It will also be seen that, with the novel combination of kneading board or surface 16 having only a lateral-wise movement and the belt 17 working therewith, though oppositely and simultaneously traveling lengthwise, the lump of dough received from the divider machine will be subjected to a thorough kneading or working, and that such manipulation will be appreciably increased when the dough comes into contact with the raised or middle portion of the working surface (Figure 1), which in practice gives to the loaf L that shape indicated in Figure 3, and which obviously will be appreciably altered or modified as the loaf moves toward the delivery or discharge end of the machine.

In lieu of the combined working board or table 16 and endless belt 17, the invention also contemplates using two similar and co-operable belts 90 (Figures 11 and 12) having pressure or abutting elements 91 mounted on pairs of pulleys 92 and 93 journalled in the end frame structures 94 and 95. Said belts are adapted to be driven by motor 18 having a suitable gearing transmission 96, 97, 98, 99 and 100 as shown. In this instance the belts are shifted lateral-wise and oppositely by crank and pitman devices similar to that described above, or in lieu of the elliptical type of rack and pinion shown in Figures 3, 9 and 10 the pitman 40 (Figure 13) may have an ordinary pin connection 101 having selective engagement with apertures 102 in disk member 103 mounted on shaft 35.

It will, therefore, be seen that, with the two co-operable belts 90 which may run at relatively different speeds and in the same or opposite directions, a lump of dough placed therebetween from the hopper 28 will be carried to the discharge end of the apparatus, and while so moving will be subjected to the requisite kneading or working for giving thereto the desired shape for delivery to the oven.

It will be understood the invention as herein disclosed is not limited to the details of construction shown and described, and that these may be varied widely without departing from the spirit of the invention except as defined by the claims.

What is claimed as new is:

1. In a bread loaf-forming machine and conveyer, the combination of a supporting structure, a dough kneading table mounted to have lateral-wise movement thereon, an endless belt mounted adjacent to and co-operable with said kneading table, a pair of pulleys on which said belt is mounted, means for vertically adjusting said belt pulleys with respect to the kneading table, a gearing transmission operable to simultaneously impart lateral-wise movement to the table and rectilinear and lateral-wise movements to said belt, as and for the purpose set forth.

2. In a bread loaf-forming machine and conveyer, the combination of a supporting structure, a dough kneading table mounted thereon, an endless belt co-operable with said kneading table, an abutting surface element lying in contact with the working length of the belt, a transmission shaft, gear elements connected to said transmission shaft including pitmans for imparting lateral-wise movement to the kneading table, and gear elements connected with the transmission to drive said belt pulleys, and including pitmans for imparting lateral-wise movement to the pulleys simultaneously with rotation thereof, said table and belt pulleys having their lateral-wise movements in opposite time relation, as and for the purpose set forth.

3. In a bread loaf-forming machine and conveyer, the combination of a supporting structure, a dough kneading table mounted to have lateral-wise movement thereon, a pair of pulleys located above and adjacent the ends of said kneading table, an endless belt on said pulleys, an abutting surface element lying in contact with the working length of said belt, a transmission shaft, pitmans connecting said shaft with said table to impart lateral-wise movement thereto, driving connections from the shaft to the pulleys for imparting rotation thereto, pitmans connecting the transmission shaft with the belt pulleys to impart lateral-wise movement thereto in opposed time relation to the lateral-wise movement of the table, devices at the ends of the table for vertically adjusting the belt with relation to the kneading table, and devices for length-wise adjustment of the belt, as and for the purpose set forth.

4. In a bread loaf-forming machine and conveyer, the combination of a supporting structure, opposed conveyer belts mounted on said structure, and means for imparting relative rectilinear and lateral-wise movements to said belts, as and for the purpose set forth.

5. In a bread loaf-forming machine and conveyer, the combination of a supporting structure, a pair of endless and opposed conveyer belts mounted on said structure, abutting surface elements co-operable with the adjacent and active lengths of said belts, and means for imparting relative rectilinear and lateral-wise movements to said belts, as and for the purpose set forth.

6. In a bread loaf-forming machine and conveyer, the combination of a supporting structure, a pair of endless and opposed conveyer belts mounted on said structure, positive driving means for said belts at their respective turns operable at relatively different speeds, and means for imparting relative rectilinear and lateral-wise movements to said belts, as and for the purpose set forth.

7. In a bread loaf-forming machine and conveyer, the combination of a supporting structure, a pair of endless and opposed conveyer belts mounted on said structure, positive driving means for said belts at their respective turns operable at relatively different speeds, abutting surface elements co-operable with the adjacent and active lengths of said belts, and means for imparting relative rectilinear and lateral-wise movements to said belts, as and for the purpose set forth.

8. In a bread loaf-forming machine and conveyer, the combination of a supporting structure, two pairs of belt pulleys journalled in said structure at the ends thereof, two endless and opposed belts mounted on said pulleys, abutting surface elements co-operable with the adjacent and active lengths of said belts, gearing connections between said pairs of pulleys, said gearings operable to drive the belts at relatively different speeds, a transmission shaft connecting said gearings, and gearings for imparting relative and opposite lateral-wise movements to said belts, as and for the purpose set forth.

9. A bread loaf-forming machine and conveyer comprising a lateral-wise movable dough kneading table, and an endless belt co-operable therewith, said kneading table having its dough working surface appreciably raised at the middle portion thereof, and sloping towards the sides thereof, as and for the purpose set forth.

10. A bread loaf-forming machine and conveyer comprising a dough kneading table, an endless belt co-operable therewith, and means for simultaneously imparting lateral-wise movement to the table and lateral-wise and length-wise movements to the belt, said table having its dough working surface raised at the middle and sloping towards the sides thereof, as and for the purpose set forth.

11. A bread loaf-forming machine and conveyer comprising a dough kneading table, an endless belt co-operable therewith, and means for simultaneously imparting lateral-wise movement to the table and lateral-wise and length-wise movements to the belt, said table being co-extensive in length and width with the working length of the belt and having an appreciable portion of its length formed with a centrally raised and lateral-wise sloping dough working surface, as and for the purpose set forth.

12. In a bread loaf-forming machine and conveyer, the combination of a supporting structure, a dough working and supporting element, an endless belt co-operable with said dough working and supporting element, means for driving the belt and simultaneously imparting lateral-wise movement thereto, and means for imparting lateral-wise movement to the dough working and supporting element, the lateral-wise movements of said dough working and supporting element and said belt being in oppositely timed relation, as and for the purpose set forth.

JOHN KOSMAN.
CHARLES S. BRYKCZYNSKI.